United States Patent
Bunn et al.

[15] 3,701,361
[45] Oct. 31, 1972

[54] VALVE ASSEMBLY AND VALVE MEMBER THEREFOR

[72] Inventors: Stuart E. Bunn; Herbert B. Owsley, both of P.O. Box 388, Shawnee Mission, Kans. 66201

[22] Filed: March 8, 1971

[21] Appl. No.: 121,934

[52] U.S. Cl.............137/543.23, 251/333, 137/DIG. 3
[51] Int. Cl.................................................F16k 15/06
[58] Field of Search.......137/543.23, DIG. 3, 543.19; 251/333

[56] References Cited

UNITED STATES PATENTS

| 502,252 | 7/1893 | Hanna............137/543.23 X |
| 1,581,778 | 4/1926 | Bromgren............251/333 X |
| 2,011,547 | 8/1935 | Campbell............137/DIG. 3 |

FOREIGN PATENTS OR APPLICATIONS

| 1,815,339 | 7/1969 | Germany............251/333 |

Primary Examiner—Arnold Rosenthal
Attorney—Fishburn, Gold and Litman

[57] ABSTRACT

A valve assembly for controlling the flow of fluid under pressure through a portion of a fluid moving structure is formed of a plurality of elements adapted to be arranged to form either an intake or an exhaust or discharge valve assembly. Each valve assembly includes a seat and cage with a valve member mounted to open and close a respective fluid flow passage through the seat in response to differential pressure. The valve head and the valve seat have opposed curves to effect self-aligning and a line contact therebetween when the valve is seated in flow closing position. The seat and cage each have a guide bore for receiving respective portions of the valve member during opening and closing movement of the valve member.

3 Claims, 5 Drawing Figures

PATENTED OCT 31 1972

3,701,361

INVENTOR.
Stuart E. Bunn
& Herbert B. Owsley
BY
Fishburn, Gold & Litman
ATTORNEYS

VALVE ASSEMBLY AND VALVE MEMBER THEREFOR

The present invention relates to valve assemblies for controlling flow of fluid under pressure through fluid moving structures and more particularly to valve assemblies having one or more poppet valves therein for controlling unidirectional flow of fluid under pressure through fluid moving structures, such as pumps, compressors, and the like.

Valve members in valve assemblies employed in fluid moving structures wherein the valve assembly is subjected to rapid operation or quick opening and and closing guide surfaces tend to wear unevenly. Uneven wear of the stem or guide surfaces permits wobble or uneven movement of the valve members in the respective guide bores and the stem wear may produce a barrel-shape causing poor seating or out of alignment position or engagement of the valve head with the respective valve seat thereby substantially reducing the efficiency of the valve assembly.

The principle objects of the present invention are: to provide a valve assembly having a valve and seat and cage members with guide bores and valve seat portions for alignment and accurate seating in substantially a line contact; to provide such a valve assembly having the component parts thereof shaped to effect substantially true linear movement of one or more valve members therein to thereby substantially increase the life of the moving parts and guide surfaces therefor; to provide such a valve assembly having valve members and valve seats which cooperate to effect substantially increase maximum efficiency in opening and closing respective flow passages through the valve assembly; to provide such a valve assembly with the valve member having a seat facing surface that is curved or a portion of a sphere in shape and a seat oppositely curved on a radius for self-aligning seating of the valve head thereon; and to provide such a valve assembly which is economical to manufacture, easily maintained and installed, positive in operation, and particularly well adapted for the proposed use.

Other objects and advantages of this invention will become apparent from the following description taken in connection with the accompanying drawings wherein are set forth by way of illustration and example, certain embodiments of this invention.

The drawings constitute a part of this specification and include an exemplary embodiment illustrating various objects and features of the valve assembly which incorporates a valve member effecting line contact with a respective valve seat.

Figure 1:
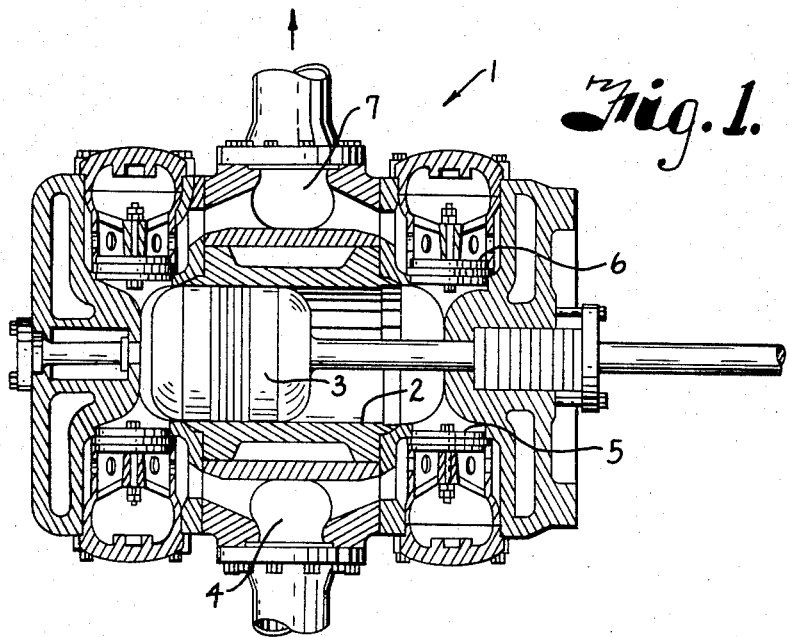
FIG. 1 is a transverse sectional view through a fluid moving structure having valve assemblies therein embodying features of the present invention.

Referring more in detail to the drawings:

As required, detailed embodiments of the invention are disclosed herein, however, it is to be understood that the disclosed embodiments are merely exemplary of the invention which may be embodied in the various forms that are different from those illustrative embodiments presented herein, therefore, specific structural and functional details disclosed herein are not to be interpreted as limiting but merely as a basis for the claims actually defining the scope of this invention. In this regard, it is to be recognized that valve assemblies which incorporate valve and seat shapes, in accordance herewith, may be embodied in various forms and furthermore that such valve assemblies may be variously positioned in fluid moving structures. However, the disclosure hereof is presented only as representative basis for teaching one skilled in the art to variously employ the present invention in virtually any appropriate detailed structure.

In the disclosed embodiment of the present invention, the reference numeral 1 generally designates a fluid moving structure, such as a compressor cylinder having a bore 2 within which a piston 3 reciprocates to compress a fluid received from an intake passage 4 through a plurality of intake valve assemblies 5. Fluid within the cylinder bore 2 is compressed between the piston 3 and a cylinder head and forced through a plurality of discharge valve assemblies 6 into a discharge passage 7 for flow to a point of storage or use (not shown). The intake valve assemblies 5 and the discharge valve assemblies 6 are each mounted in the respective flow passages 4 and 7 for unidirectional flow of fluid under pressure therethrough, such as produced by the piston 3 on intake and discharge strokes respectively.

The intake valve assemblies 5 and the discharge valve assemblies 6 are each operative for controlling flow of fluid under pressure through a portion of the fluid moving structure 1. The component parts of the assemblies 5 and 6 may be arranged to form either single or multiple deck valve assemblies, each having a seat member 8 and a cage member 9 with one or more movable valve members 10 mounted therebetween to open and close respective fluid flow passages through the respective decks in response to differential pressure.

The structure of the valve seat member 8 and the valve cage member 9 is preferably the same as shown and described in our copending application for Multiple Poppet Valve Structure; Ser. No. 875,431; and filed Nov. 10, 1969 except for the valve member or members 10, guide surfaces for same, and valve seat contours, as later described.

In the illustrated structure, the valve seat member 8 has one or more unimpeded fluid flow passages therethrough in the form of generally circular port or ports 11 extending therethrough. Each of said ports or passages 11 has a curved portion to define a valve seat 12 for engagement by respective valve members 10, as later described. The ports 11 through the seat member 8 have a guide bore portion 13 extending from the valve seat 12 to define guide surfaces for engagement by a guide member 14 of the valve member 10, as later described, during the movement thereof to open and close the respective port 11.

The illustrated cage member 9 has one or more guide bores 15 aligned with respective port or ports 11 of the seat member 8 and each guide bore 15 is illustrated as being in the form of a cylindrical recess to define guide surfaces for engagement by a guide member 16 of the valve member 10, as later described, during movement thereof to open and close the respective port 11. The bores 15 may have a bottom surface 17 with a vent passage 18 therethrough to facilitate desired reciprocation of the valve member 10 under differential pressure acting thereon.

Figure 2:
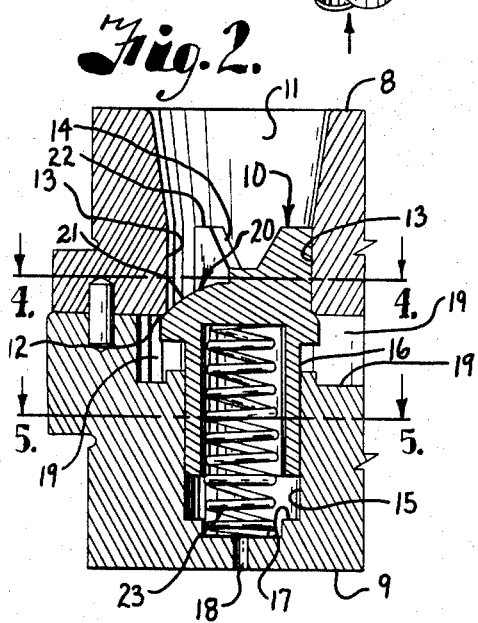
FIG. 2 is an enlarged sectional view of the valve assembly portion showing a valve member, guide surfaces therefor, and seat engaged thereby when in fluid flow closing position.
Figure 4:
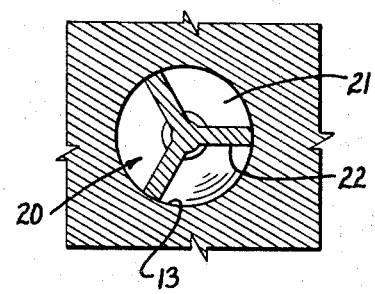
FIG. 4 is an enlarged transverse sectional view through the valve assembly taken on line 4—4, FIG. 2.
Figure 5:
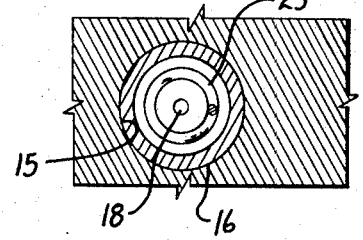
FIG. 5 is an enlarged transverse sectional view through the valve assembly taken on line 5—5, FIG. 2.
Figure 3:
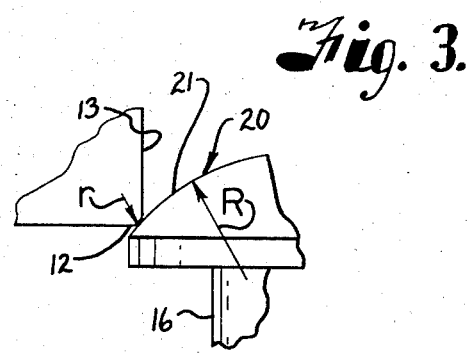
FIG. 3 is a greatly enlarged fragmentary view showing the shape of the cooperating curves of the valve head and seat.

As illustrated in FIG. 2, the valve seat member 8 is a planar member having one or more of the ports 11 arranged therein to align with the respective guide bore or bores 15 of the cage member 9. The cage member 9 has space defining portions or walls 19 adjacent the bores 15 and ports 11 and spaced from the seat member 8 to accommodate movement of the head of the respective valve member 10 between port opening and closing positions. The cage member 9 has suitable fluid flow passages (not shown) therethrough and communicating with the space defined by the portions or walls 19. The valve member or members 10 preferably have the guide member 16 mounted in the respective guide bore 15 of the cage member 9.

In the illustrated embodiment, the valve member or members 10 are each poppet valve structures and the guide member 16 thereof is a tubular stem slidably mounted in the respective guide bore 15. The valve member or members 10 each have a head 20 which is substantially larger than the respective port 11 and has a surface 21 adapted to engage and cooperate with the seat 12 to close the port 11 and prevent leakage thereby. When the valve head 20 is spaced from the respective valve seat 12, fluid flows through the port 11 and through the passages in the cage member 9.

Line contact or line engagement between the surface 21 of the head 20 and the valve seat 12 is desirable to effect positive seating and to substantially avoid delayed seating which may occur when either the valve seat 12 or the heat 20 of the valve member 10 are worn or when the stem portion 16 is worn unevenly thereby permitting uneven linear movement of the valve member 10 toward and away from the valve seat 12.

In the illustrated structure, the head 20 has the valve seat engaging surface 21 thereof in the form of a portion of a sphere and the valve seats 12 are surfaces on a radius of reverse curvature. The spherical portion of the heat 20 and the curved portions of the valve seats 12 are convex in opposite directions whereby engagement of the spherical portion of the valve member 10 with the respective valve seat 12 effects engagement therebetween substantially on a line. These seating surfaces cooperate to facilitate self-alignment of the valve member in seating.

The valve sizes and curvatures of the valve head and seat vary. As an example of relative sizes, a valve structure with a port 11 approximately 1 ⅛ inches in diameter may have a valve with a head of approximately 1 5/16 inches in diameter and the spherical surface 21 on a radius R of 1 inch. The radius r of the seat for such a valve head is preferably of one Thirty-second inch to Three-sixteenths inch. The valve seats are preferably of a hard metal and the valve members may be of metal, such as bronze or steel. However, such poppet valves of a long wearing synthetic resin have been used and the light weight thereof have provided improved compressor efficiencies. When the valve member 10 is made of hard materials, such as metal, the radius r of the valve seat curvature is preferably in the lower portion of the range, such as one thirty-second inch to three thirty-seconds inch. When the valve member is of softer material, such as synthetic resin, the radius r of the valve seat curvature is preferably in the higher portion of the range, such as three thirty-seconds inch to three-sixteenths inch. The dimensions given herein are exemplary only as the valves vary in size with compressor size and capacity.

The guide member 14 of the valve member 10 received and movable in the guide bore portion 13 of the seat member 8 is illustrated as being in the form of a plurality of circumferentially spaced fins 22 at one end of the valve member 10 extending from the spherical portion of the head 20. The fins 22 each have one edge thereof in sliding engagement with a surface defining the respective guide bore portion 13 of the port 11 whereby the fins 22 cooperate with the stem portion 16 at the other end of the valve member 10 and which is also in sliding engagement with a surface defining the respective guide bore 15 of the cage member 9 to thereby effect substantially true linear movement of the valve member or members 10 toward and away from the respective valve seat 12.

It is desirable to provide suitable resilient means, such as an elongated helical spring 23, sleeved within the tubular stem portion 16 of the respective poppet valve member 10 and having one end thereof bottomed within the respective guide bore or recess 15 for urging the head 20 into positive seating engagement with the respective valve seat 12 to close the respective port 11 through the seat member 8. When the head 20 engages the respective valve seat 12 in the seat member 8 thereby closing the respective port 11, there will be no fluid flow through the valve cage member 9 and the valve seat member 8.

The valve seat member 8 and valve cage member 9 are suitably secured together to form the respective intake valve assembly 5 and the discharge valve assembly 6 and the assemblies are suitably secured in the respective passages 4 and 7 and in engagement with a suitable bonnet, as best shown in FIG. 1 and preferably similar to the means for securing the seat member 8 and the cage member 9 together and mounting same in the fluid moving structure 1 shown and described in our copending application Ser. No. 875,431, filed Nov. 10, 1969.

It is to be understood that while we have illustrated and described one form of our invention, it is not to be limited to this specific form or arrangement of parts herein described and shown.

What We claim and desire to secure by Letters Patent is:

1. A valve assembly for control ling unidirectional controlling of fluid under pressure through fluid moving structures comprising:

a. a seat member having a seat face and an unimpeded flow passage therethrough, said fluid flow passage having a mouth at said seat space and a guidable bore portion extending from adjacent said seat face;

b. a valve seat at said passage mouth and seat space, said valve seat having a surface on a radius defining a convex curve connecting the seat face and the surface of the flow passage at said passage mouth;

c. a cage member secured to the seat member and having a cage face in opposed relation to the seat face and spaced therefrom;

d. said cage member having a guide bore therein extending from said cage face and aligned with said valve seat and guide portion of said flow passage, said guide bore terminating in a closed end;

e. a valve member for said valve seat and having a head with a seat engaging portion of a spherical curvature, said valve head and valve seat curvatures being convex in opposite direction;

f. said valve member having a guide structure extending from said valve head, said guide structure having a plurality of circumferentially spaced portions in sliding engagement with a surface defining the guide bore portion of the seat member;

g. a cylindrical stem extending from said valve head in a direction opposite to said guide structure, said stem being in sliding engagement with a surface defining the guide bore of the cage member;

h. a spring member in the guide bore of the cage member and having ends engaging the valve member and guide bore end to resiliently urge the valve head into seating engagement with the valve seat;

i. a vent passage extending from the closed end of the guide bore of the cage member to the exterior thereof for restricted fluid flow to and from said guide bore between the valve stem and closed end thereof.

2. A valve assembly as set forth in claim 1 wherein:

a. said cage member having a recessed portion extending from the seat member face to said cage face and cooperating with the seat member face to define a cavity, said valve head being confined by the seat member and cage member and operable in said cage member cavity;

b. said guide structure on the valve member being a plurality of circumferentially spaced guide fins integral with said valve head with the spaced portion having sliding engagement with the surface of the guide bore portion being edges of said fins;

c. said cylindrical stem being integral with said valve head, said stem being hollow and having an open end facing the end of the guide bore;

d. said spring member being positioned in said hollow stem of the valve member with a portion extending therefrom engaging said closed end of the guide bore.

3. A valve assembly as set forth in claim 2 wherein:

a. the valve member, head, guide fins and stem are integral and of synthetic resin;

b. the convex curve of the valve seat has a radius of one thirty-second inch to three-sixteenths inch.

* * * * *